(No Model.) 3 Sheets—Sheet 1.

A. HART.
MOWER.

No. 605,874. Patented June 21, 1898.

WITNESSES.
Julia M. Bristol
Nellie McKibben

INVENTOR.
Alfred Hart

BY
Brandt, Adams, Pickard & Jackson
ATTYS.

(No Model.) 3 Sheets—Sheet 2.
A. HART.
MOWER.
No. 605,874. Patented June 21, 1898.
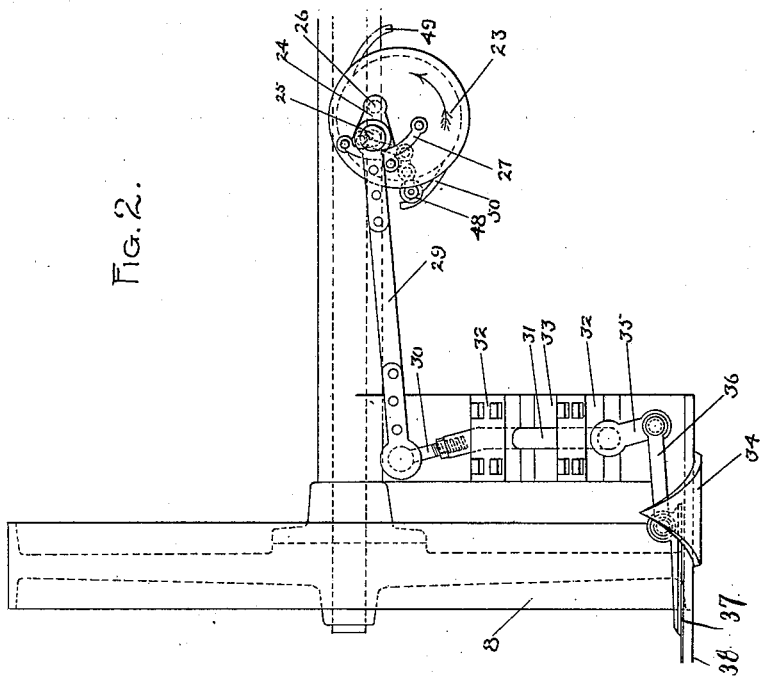
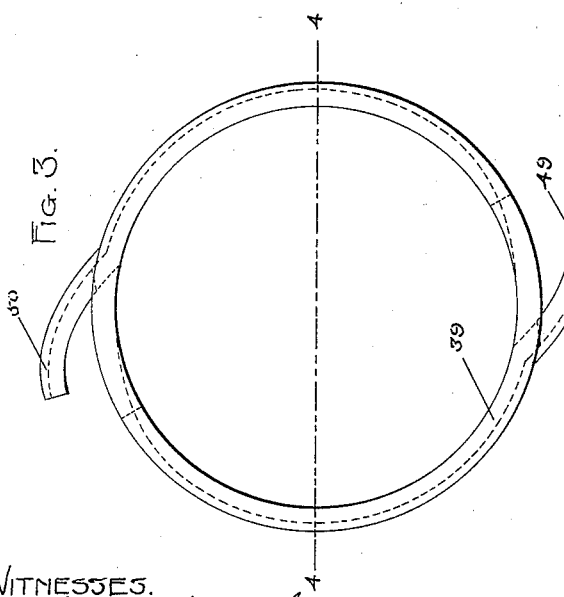
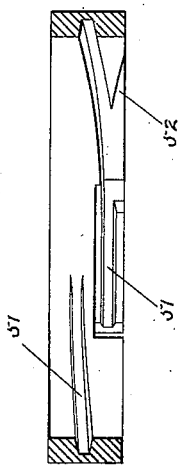
WITNESSES.
Julia M. Bristol
Sallie McKibben
INVENTOR.
Alfred Hart
BY Bond, Adams, Pickard & Jackson
ATTYS.

(No Model.) 3 Sheets—Sheet 3.

A. HART.
MOWER.

No. 605,874. Patented June 21, 1898.

WITNESSES.
Julia M Bristol
Nellie McKibben

INVENTOR.
Alfred Hart
BY Bond Adams Pickard & Jackson
ATTYS.

UNITED STATES PATENT OFFICE.

ALFRED HART, OF CHICAGO, ILLINOIS, ASSIGNOR TO FREDERICK E. HART AND RALPH W. HART, OF SAME PLACE.

MOWER.

SPECIFICATION forming part of Letters Patent No. 605,874, dated June 21, 1898.

Application filed November 24, 1894. Serial No. 529,835. (No model.)

*To all whom it may concern:*

Be it known that I, ALFRED HART, a citizen of the United States, residing in Chicago, Cook county, Illinois, have invented certain new and useful Improvements in Mowers, of which the following is a specification, reference being had to the accompanying drawings, in which—

Figure 1:
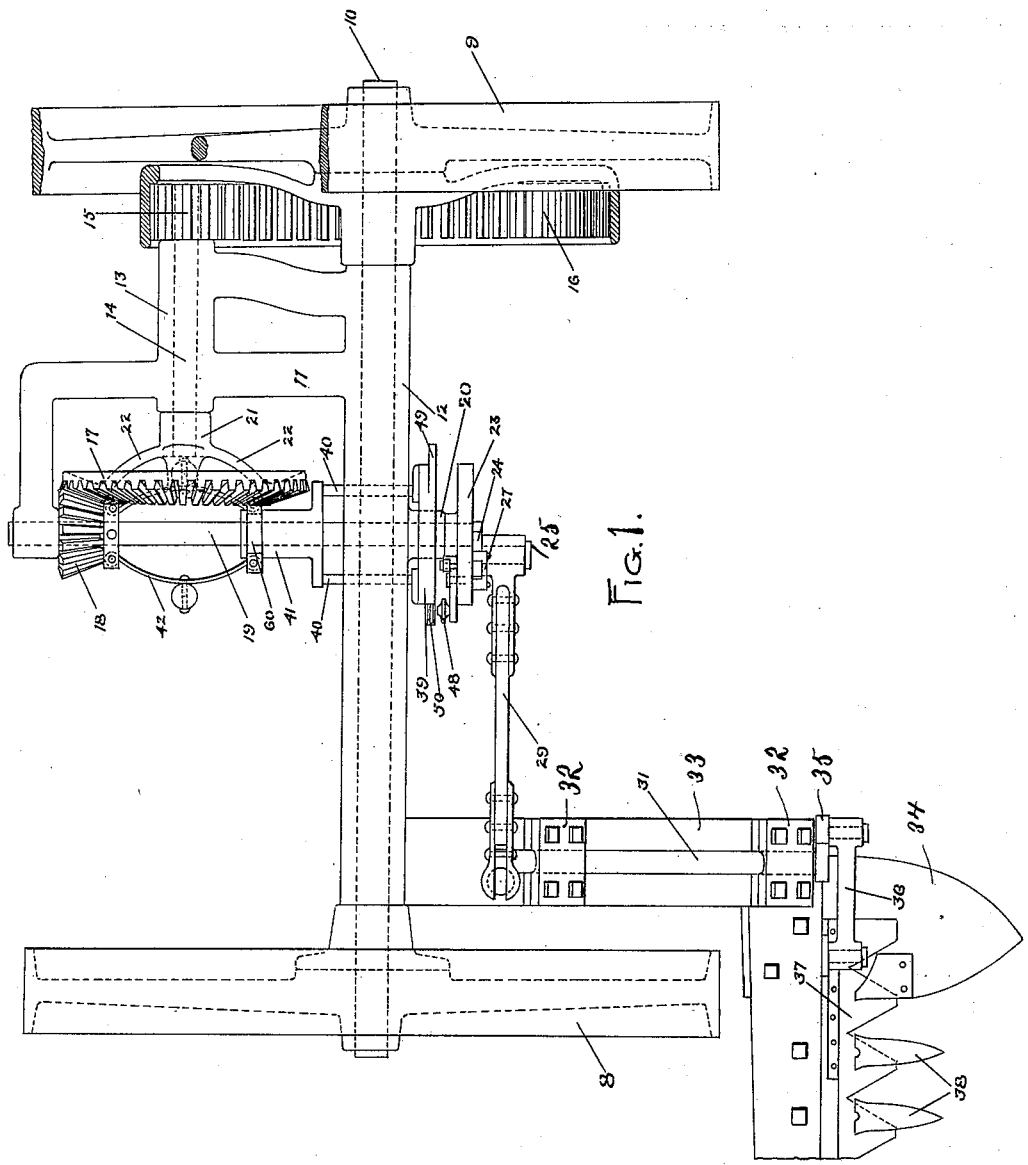
Figure 5:
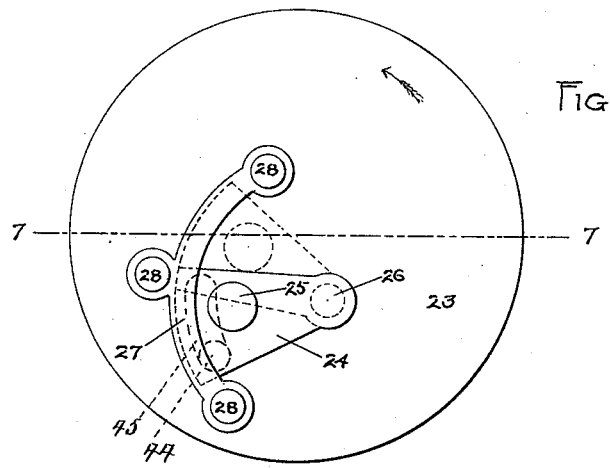
Figure 7:
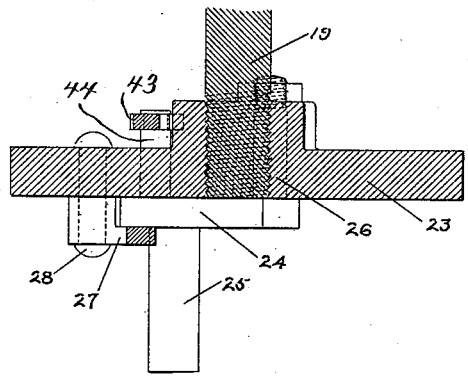
Figure 6:
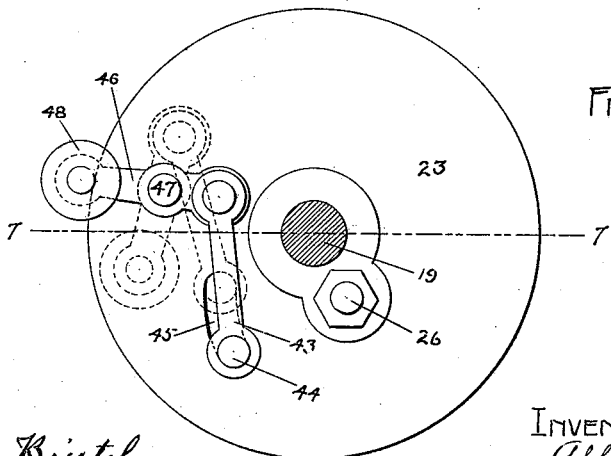

Figure 1 is a plan view, part of the sickle being cut away. Fig. 2 is a partial front view. Fig. 3 is a plan view of the cam. Fig. 4 is a section on line 4 4 of Fig. 3. Fig. 5 is a front view of the driving-disk. Fig. 6 is a rear view of the same. Fig. 7 is a section on line 7 7 of Figs. 5 and 6.

In mowers and other harvesting-machines as heretofore constructed it frequently happens that when the machine is started in long grass the grass becomes wedged into the space between the fingers and the sickle-sections, thereby choking the machine and stopping it, and it is necessary for the operator to laboriously remove such grass before the sickle can be started again. This is a great source of annoyance to operators of mowing and reaping machines, and it is one which many have attempted to cure; but, so far as I know, none of such efforts have up to this time been successful.

The object of my present invention is to provide an improved harvesting-machine which will be so constructed that it may be started freely in long grass or under any other circumstances which in machines heretofore constructed would result in choking the machine or seriously interfering with its operation. This object I accomplish by providing driving mechanism for the sickle-bar, the action of which will be such that when the machine is started the stroke of the sickle-bar will be short and it will be driven with greater power, and when the headway of the machine increases the throw of the sickle-bar will be increased to the normal mowing stroke. In this way the machine may be started up in the midst of long grass without danger of choking, and it may be used for cutting any kind of grass with satisfactory results.

I have shown my improvements as applied to a mower; but it will be understood that they may be applied to any other harvesting-machine.

Referring to the accompanying drawings, 8 9 indicate the wheels of the mower, which are mounted upon an axle 10.

11 indicates the frame of the machine, which at its forward end is provided with a sleeve 12, mounted upon the axle 10, between the wheels 8 9, in the usual way.

13 indicates a second sleeve located back of the first, forming a part of the frame 11, in which sleeve is journaled a shaft 14. (Indicated by dotted lines in Fig. 1.) Upon one end of the shaft 14 is a pinion 15, which meshes with a gear 16, carried by and rotating with the axle 10. The gear 16 is preferably an internal gear; but it may be of the ordinary form, if desired. Upon the opposite end of the shaft 14 is a bevel-gear 17, which meshes with a bevel-pinion 18, mounted upon a shaft 19, which is arranged at right angles to the axle 10 and extends to a point forward of such axle, as shown in Fig. 1, its forward end being journaled in a suitable bearing 20, connected to the sleeve 12. The center of the gear 17 is open, it being held to its hub 21 by curved spokes 22, the object of which will hereinafter appear.

Mounted upon and keyed to the forward end of the shaft 19 is a driving-disk 23, upon the forward face of which is pivoted a segment 24, carrying a wrist-pin 25. The segment 24 is mounted on a pivot 26, arranged eccentrically, so that as the segment 24 is moved upon its pivot the wrist-pin 25 will be moved toward and from the center of the driving-disk 23, as indicated by dotted lines in Fig. 5.

In order to hold the segment 24 closely in its proper position and to strengthen it, a segmental guide-bar 27 is provided, which is secured by rivets 28 or other suitable means upon the disk 23 in such position as to overlap the edge of the segment 24, as shown in Figs. 5 and 7.

29 indicates a pitman, one end of which is connected to the wrist-pin 25, the opposite end thereof being connected to an arm 30 of a rock-shaft 31, which is mounted in suitable bearings 32 upon an inclined support 33, the rear end of which is connected to the sleeve 12, the forward end of said support being connected to a shoe 34. At its forward end the rock-shaft 31 is provided with a crank-arm 35, which is connected by a pitman 36 to the sickle-bar 37.

38 indicates the usual finger-bar. The arrangement is such that as the disk 23 is rotated the rock-shaft 31 will be rocked, thereby effecting a reciprocation of the sickle-bar 37 in the usual manner, and from the above description it will be seen that the disk 23 is positively rotated by the movement of the mower. The particular construction of the shoe 34 and the method of mounting the rock-shaft 31, sickle-bar 37, and other details of the cutting devices may be varied as desired, as the only feature which is essential to the application of my invention is the reciprocating sickle-bar adapted to be driven by the rotation of the driving-disk 23 in the manner hereinafter to be described.

It will be observed that the disk 23 is caused to rotate in the direction indicated by the arrow in Fig. 2 by the forward movement of the machine. The wrist-pin 25 will normally lie at its greatest distance from the center of said disk, owing to the fact that when the pivot 26 is above the center of the disk 23 the wrist-pin 25 will either be above a line drawn from said pivot to the point at which the pitman 29 is connected to the crank-arm 30 or in such line. Inasmuch as at this time a pushing force will be exerted upon the pitman there will be no tendency to move the wrist-pin 25 toward the center. When the pivot 26 is below the center of the disk 23 and a pulling force is applied to the pitman, the wrist-pin 25 will be prevented by such force from swinging forward, as would be necessary for it to do in moving toward the center of the disk. The adjustments of the pitmen and rock-shaft 31 are such that when the wrist-pin 25 is at its greatest distance from the center of the disk 23 the sickle-bar will have the proper stroke to adapt it for normal cutting, and, as will be hereinafter described, at such time the sickle-bar is reciprocated at a high rate of speed. It is evident also that by moving the wrist-pin 25 toward the center of the disk 23 the throw of the sickle-bar will be reduced, but the power will be increased, which adapts it for starting in long grass or for use under circumstances in which the machine is apt to become choked up.

For the purpose of providing for a short throw of the sickle-bar when the machine is starting a cam 39 is provided, which is carried by rods 40, moving in suitable bearings in the sleeve 12 and connected to a sleeve 41, mounted loosely upon the shaft 19. The sleeve 41 is connected by a collar 60 to a spring-governor 42, which is mounted upon and keyed to the shaft 19, the arrangement being such that when the machine is stopping the action of the governor will be such as to move the sleeve 41 forward, moving the cam 39 toward the disk 23. This will cause the segment 24 to be shifted to the position shown by dotted lines in Fig. 5, thereby moving the wrist-pin 25 toward the center of the disk. Such movement of the segment 24 is effected through the instrumentality of a rod 43 on the rear face of the disk 23, one end of which rod is connected to a pin 44, which passes through a segmental slot 45 in the disk 23 and is connected to the segment 24. The opposite end of the rod 43 is connected to a rocking lever 46, mounted upon a pivot 47, secured in the disk 23. The opposite end of the lever 46 carries a roller 48, which normally projects slightly beyond the periphery of the disk 23, as shown in Fig. 6. The lever 46 is adapted to be turned upon its pivot 47, so that the roller 48 lies within the periphery of the disk 23, and when said lever is so moved by means of the rod 43 the position of the segment 24 is shifted, as above stated. This movement of the lever 46 is effected when the cam 39 is moved toward the disk 23, as above described, owing to the fact that when the cam 39 is so moved the roller 48 will move into engagement with said cam and be pressed back within the periphery of the disk 23 to the position shown in Fig. 6. The roller 48 is caused to enter the cam 39 by means of ears 49 50, which project in a more or less tangential position from diametrically opposite points of the cam 39, as shown in Fig. 3. Such ears are provided with grooves 51 to serve as guides for the roller 48 in entering such cam. As shown in Fig. 4, such grooves terminate between the edges of the cam, so that when the roller 48 enters the cam and such cam remains in its forward position said roller will remain within said cam while the disk 23 continues to rotate. If, however, said cam is drawn back by the increasing speed of the machine through the action of the governor 42, the roller 48 will be free to move out of engagement with said cam by means of inclined passages 52. I prefer to provide two ears 49 50; but, if desired, one only may be used.

The position of the cam with reference to the driving-disk 23 is so adjusted that the roller 48 will enter the cam when the machine reaches that part of its stroke where it is doing the least work—that is, when the sickle-bar is at one end or the other of its stroke and the outlets are similarly arranged. The grooves 51 prevent the roller from passing off of the cam at any other point than by means of the passages 52. This makes the action of the shifting mechanism much easier and prevents it from interfering with the operation of the machine.

By the construction above described it will be seen that upon starting the mower the sickle-bar will be given a short stroke, which will be increased to the normal stroke as soon as the machine attains a certain degree of speed. The adjustment of the governor is preferably such that the sickle-bar will be given its normal cutting stroke when the machine moves at about three-fourths the normal rate of speed, the object being to prevent slight irregularities in the speed of the machine from affecting the operation of the sickle-bar.

I have described my invention in detail; but I wish it to be understood that I do not restrict myself to the specific details shown and described, as my invention resides, broadly, in providing a reciprocating sickle with means which act automatically to adjust the operating mechanism of said sickle for changing the length of the stroke thereof as well as in the details claimed, and therefore I wish it to be understood that my invention includes mechanical equivalents for the mechanism described.

That which I claim as my invention, and desire to secure by Letters Patent, is—

1. In a harvesting-machine, a reciprocating sickle, mechanism for reciprocating said sickle, and means which act automatically to adjust the operating mechanism for changing the length of the stroke of the sickle, substantially as described.

2. In a harvesting-machine, a reciprocating sickle having a stroke of variable length dependent upon the speed of the machine, substantially as described.

3. In a harvesting-machine, the combination with a reciprocating sickle, of means for reciprocating said sickle by the movement of the machine, and mechanism whereby increase of speed of the machine increases the length of stroke of the sickle, substantially as described.

4. In a harvesting-machine, the combination with a sickle, and means for driving said sickle by the movement of the machine, of mechanism operated by variation of the speed of the machine for driving the sickle with the greatest power when the machine moves slowly and for driving the sickle with less power when the speed of the machine is increased, substantially as described.

5. In a harvesting-machine, the combination with a reciprocating sickle, of means for reciprocating said sickle by the motion of the machine, a governor, and devices controlled by the governor, whereby increase of speed of the machine increases the length of stroke of the sickle, substantially as described.

6. In a harvesting-machine, the combination with a reciprocating sickle, and means for reciprocating said sickle by the movement of the machine, of mechanism which acts to drive the sickle with a short stroke when the machine moves slowly and to suddenly increase the length of stroke of the sickle when the machine moves more rapidly, substantially as described.

7. In a harvesting-machine, a reciprocating sickle, mechanism for reciprocating said sickle, and means for adjusting the sickle-operating mechanism while the harvester is in motion to change the length of stroke of the sickle, substantially as described.

8. In a harvesting-machine, the combination with a reciprocating sickle, a rotary shaft, means for driving said shaft by the forward movement of the machine, a driving-disk, and a wrist-pin carried thereby, of mechanism connected to said wrist-pin for reciprocating said sickle, and means for moving said wrist-pin toward and from the axis of the driving-shaft while the machine is moving, substantially as described.

9. In a harvesting-machine, the combination with a reciprocating sickle, a rotary shaft, means for driving said shaft by the forward movement of the machine, a driving-disk, and a wrist-pin carried thereby, of mechanism connected to said wrist-pin for reciprocating said sickle, a governor, and cam mechanism operated by said governor to move said wrist-pin toward and from the axis of the driving-shaft, substantially as described.

10. In a harvesting-machine, the combination with a reciprocating sickle, a rotary shaft, means for driving said shaft by the forward movement of the machine, and a driving-disk mounted upon said shaft, of a segment 24 pivoted upon said disk, a wrist-pin carried by said segment, and mechanism whereby the segment is operated and the position of the wrist-pin, relatively to the axis of the driving-shaft, is regulated by the speed of the machine in traversing the field, substantially as described.

11. In a harvesting-machine, the combination with a reciprocating sickle, a rotary shaft, means for driving said shaft by the forward movement of the machine, and a driving-disk mounted upon said shaft, of a segment 24 pivoted upon said disk, a wrist-pin carried by said segment, a lever 46 pivoted to said disk, said lever being connected to said segment, and a cam movable into engagement with said lever, substantially as and for the purpose specified.

12. In a harvesting-machine, the combination with a reciprocating sickle, a rotary shaft, means for driving said shaft by the forward movement of the machine, and a driving-disk mounted upon said shaft, of a segment 24 pivoted upon said disk, a wrist-pin carried by said segment, a lever 46 pivoted to said disk, said lever being connected to said segment, a cam 39, having an ear 49 and groove 51, and means for moving said cam toward and from said disk, substantially as described.

13. In a harvesting-machine, the combination with a reciprocating sickle, a rotary shaft, means for driving said shaft by the forward movement of the machine, and a driving-disk mounted upon said shaft, of a segment 24 pivoted upon said disk, a wrist-pin carried by said segment, a lever 46 pivoted to said disk, said lever being connected to said segment, a cam movable into engagement with said lever, and guides controlling the points at which said lever may be moved into and out of engagement with said cam, substantially as described.

14. The combination with a rotary disk and a reciprocating pitman connected to and actuated by said disk, of means controlled by the speed of said disk for automatically varying the length of the stroke of the pitman, substantially as described.

ALFRED HART.

Witnesses:
JOHN L. JACKSON,
JULIA M. BRISTOL.